(12) United States Patent
Bober

(10) Patent No.: US 8,118,800 B2
(45) Date of Patent: Feb. 21, 2012

(54) FLUID ABSORBENT TAPE

(75) Inventor: Andrew M. Bober, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 166 days.

(21) Appl. No.: 12/613,307

(22) Filed: Nov. 5, 2009

(65) Prior Publication Data

US 2010/0047501 A1 Feb. 25, 2010

Related U.S. Application Data

(63) Continuation of application No. 10/818,779, filed on Apr. 6, 2004, now Pat. No. 7,618,402.

(51) Int. Cl.
*A61F 13/15* (2006.01)
*A47L 25/00* (2006.01)
*A47L 13/20* (2006.01)

(52) U.S. Cl. ............... 604/385.11; 604/385.01; 15/228; 15/229.7

(58) Field of Classification Search .................. 604/391, 604/385.01, 385.14, 385.11; 15/228, 227, 15/209.1, 229.1, 104.94, 215, 118, 105, 210.1; 134/6

See application file for complete search history.

(56) References Cited

U.S. PATENT DOCUMENTS

| | | |
|---|---|---|
| 4,401,447 A | 8/1983 | Huber |
| 4,429,001 A | 1/1984 | Kolpin et al. |
| 4,497,712 A | 2/1985 | Cowling |
| 4,705,715 A | 11/1987 | DeCoste, Jr. et al. |
| 4,965,129 A | 10/1990 | Bair et al. |
| 5,227,225 A | 7/1993 | Mamish |
| 5,246,770 A | 9/1993 | Bottiglione et al. |
| 5,356,678 A | 10/1994 | Heitzhaus et al. |
| 5,419,955 A | 5/1995 | Ehrhardt et al. |
| 5,599,334 A | 2/1997 | Johnston et al. |
| 5,640,827 A | 6/1997 | Van Someren et al. |
| 5,683,813 A | 11/1997 | Davis |
| 5,743,674 A | 4/1998 | Healy |
| 5,821,179 A | 10/1998 | Masaki et al. |
| 5,876,390 A | 3/1999 | Hall et al. |
| 5,906,952 A | 5/1999 | Everaere et al. |
| 6,102,892 A | 8/2000 | Putzer et al. |
| 6,129,717 A | 10/2000 | Fujioka et al. |
| 6,129,964 A | 10/2000 | Seth |
| 6,162,959 A | 12/2000 | O'Connor |
| 6,191,335 B1 | 2/2001 | Robinson |

(Continued)

FOREIGN PATENT DOCUMENTS

JP 9127383 5/1997

(Continued)

*Primary Examiner* — Jacqueline F. Stephens
(74) *Attorney, Agent, or Firm* — Gregory S. Bollis

(57) ABSTRACT

A fluid absorbent tape is divided into sections that can be separated to customize the length of the tape and simplify use. In one embodiment of the invention, the fluid absorbent tape includes an absorbent material enclosed in a fluid permeable cover to form an elongated fluid absorbent tape. Separating structure formed in a transverse direction through the elongated fluid absorbent tape divides the elongated tape into a first section of fluid absorbent tape and a second section of fluid absorbent tape. The first section of fluid absorbent tape is separable from the second section of fluid absorbent tape along the separating structure. In another embodiment of the invention, the fluid absorbent tape includes a fluid absorbent material including a super absorbent polymer. An elongated fluid permeable cover having a length encloses the fluid absorbent material, and is divided into sections along the length. Each of the sections have closed ends to inhibit the fluid absorbent material from falling out of the sections through the ends.

22 Claims, 2 Drawing Sheets

U.S. PATENT DOCUMENTS

| | | |
|---|---|---|
| 6,296,904 B1 | 10/2001 | Zimmermann |
| 6,548,135 B1 | 4/2003 | Hershey et al. |
| 6,559,081 B1 | 5/2003 | Erspamer et al. |
| 2001/0055927 A1 | 12/2001 | May |
| 2002/0012792 A1 | 1/2002 | Cinelli et al. |
| 2002/0114946 A1 | 8/2002 | Nickel |
| 2002/0122936 A1 | 9/2002 | Nickel |
| 2003/0079830 A1 | 5/2003 | Kuller et al. |
| 2003/0207085 A1 | 11/2003 | Gruber |
| 2004/0225248 A1 | 11/2004 | Klein |

FOREIGN PATENT DOCUMENTS

| | | |
|---|---|---|
| JP | 9207258 | 8/1997 |
| WO | 03/063750 | 8/2003 |
| WO | 03/097938 | 11/2003 |

FLUID ABSORBENT TAPE

RELATED APPLICATIONS

This patent application is a continuation of U.S. patent application Ser. No. 10/818,779, filed on Apr. 6, 2004.

TECHNICAL FIELD

This invention relates to fluid absorbent tape, and in particular to an elongated fluid absorbent tape including absorbent material for controlling the flow of fluid on a surface.

DESCRIPTION OF THE BACKGROUND ART

When a floor finish is stripped from a floor, an aqueous stripping solution is often applied to the floor. Because the floors in many buildings are rarely perfectly level, the stripping solution will flow to low points in the floor. Unfortunately, the low points are not always conveniently within the area being stripped. As a result, the stripping solution will flow outside of the area being stripped, under doors, fixtures, furniture, display shelves, or off the floor onto adjacent surfaces, such as carpeting. This can cause unnecessary additional work refinishing adjacent areas, damage to fixtures, such as severe rusting, or permanent damage to the adjacent surfaces, such as discoloration of carpeting. Additionally, when the bulk of the stripping solution is removed from the floor and a new finish is applied, the stripping solution that had flowed underneath the fixtures, furniture, and display shelves, can seep back out onto the new finish, causing additional repair work or unsightly damage to the new finish.

The current practices are to do nothing to control the flow of stripping material and repair the damage as it occurs, or to use plastic sheets and masking tape to seal off edges of the surface being stripped. Sealing the edges of the surface being stripped is problematic in that it is time consuming, difficult because the worker must bend over or crawl along the floor on hands and knees, and irregularities in the floor or taping process cause leaks and gaps that the stripping solution can flow through. Although spill absorbent pads or pigs are available, they are provided in only fixed lengths and are typically too expensive to use over a large area. Accordingly, a need exists for a fluid absorbent tape that is easy to use and is customizable for different sized areas.

SUMMARY OF THE INVENTION

The present invention provides a fluid absorbent tape that is divided into sections. The sections can be separated to customize the length of the tape and simplify use. In one embodiment of the invention, the fluid absorbent tape includes an absorbent material enclosed in a fluid permeable cover to form an elongated fluid absorbent tape. Separating structure formed in a transverse direction through the elongated fluid absorbent tape divides the elongated tape into a first section of fluid absorbent tape and a second section of fluid absorbent tape. The first section of fluid absorbent tape is separable from the second section of fluid absorbent tape along the separating structure. In another embodiment of the invention, the fluid absorbent tape includes a fluid absorbent material including a super absorbent polymer. An elongated fluid permeable cover having a length encloses the fluid absorbent material, and is divided into sections along the length. Each of the sections have closed ends to inhibit the fluid absorbent material from falling out of the sections through the ends.

A general objective of the present invention is to provide a fluid absorbent tape that has a customizable length. This objective is accomplished by dividing the fluid absorbent tape into sections.

Another objective of the present invention is to provide a fluid absorbent tape that is customizable and is easy to use. This objective is accomplished in one embodiment of the invention by dividing the fluid absorbent tape into sections using separating structure which simplifies shortening the fluid absorbent tape to a desired shortened length.

Yet another objective of the present application is to provide a fluid absorbent tape that is customizable and does not create additional work. This objective is accomplished in one embodiment of the invention by dividing the fluid absorbent tape into sections and closing the ends of the sections, such that absorbent material does not fall out of the section ends.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
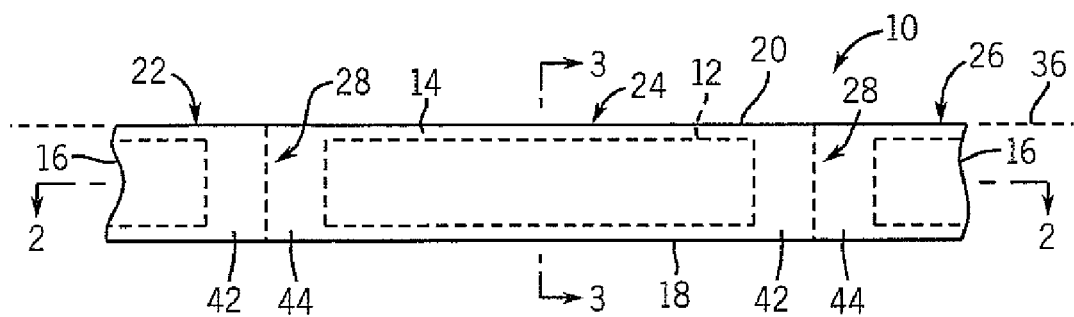
FIG. 1 is a top plan view of a fluid absorbent tape incorporating the present invention.
Figure 2:
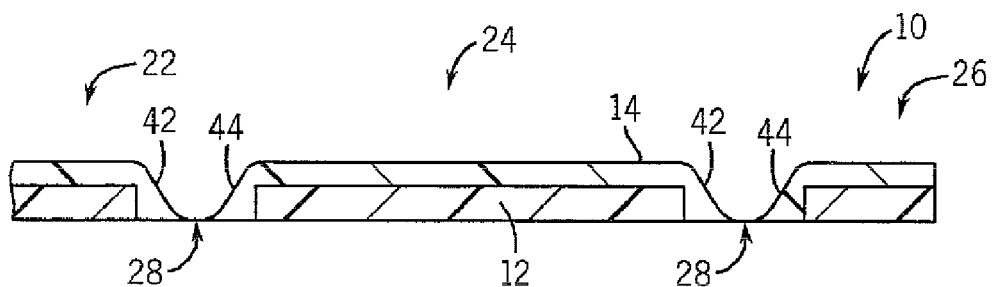
FIG. 2 is a sectional view along line 2-2 of FIG. 1.
Figure 3:
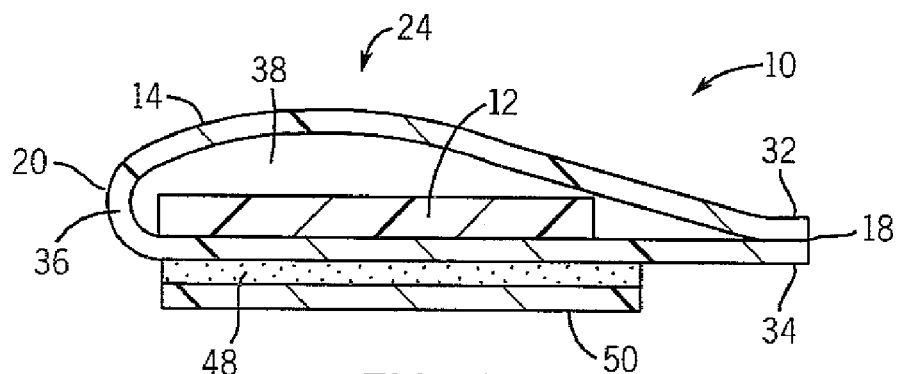
FIG. 3 is a sectional view along line 3-3 of FIG. 1.

A fluid absorbent tape 10, shown in FIGS. 1-3, for use in controlling the flow of fluid on a surface includes an absorbent material 12 enclosed in a fluid permeable cover 14. The tape 10 has an elongated length that extends between tape ends 16 and a width that extends transversely between longitudinal edges 18, 20. In a preferred embodiment, the length is divided into sections 22, 24, 26 by separating structure 28 extending transversely between the longitudinal edges 18, 20 that allows a user to easily select a desired shortened length of the tape 10 for controlling the flow of a fluid on the surface. The shortened length of the tape 10 is selected by separating adjacent sections 24, 26 corresponding to the desired shortened length.

The absorbent material 12 is preferably, a super absorbent polymer (SAP), such as polyacrylate absorbents, which is commercially available and can absorb many times its own weight of an aqueous fluid. The absorbent material 12 can be in any form, such a fibrous, granular, powder, gel, and the like without departing from the scope of the invention. Moreover, if the absorbent material 12 is provided in a granular or powder form, the powder or grains can be enclosed in small fluid permeable or soluble pillows or packets that can expand or rupture as the absorbent material 12 expands upon absorption of a fluid. Although an absorbent material for absorbing aqueous fluids, such as SAP is preferred, any suitable absorbent material can be absorb the fluid being controlled, such as clay, sponge material, petroleum absorbent material, and the like, can be used without departing from the scope of the invention.

The absorbent material 12 is enclosed within the elongated fluid permeable cover 14, such as formed from a non-woven fabric. The cover 14 allows fluid to flow therethrough and be absorbed by the absorbent material 12. Preferably, indicia, such as the word "Caution", icons, and the like, is printed on the cover to warn pedestrians of fluid on the surface that is being controlled by the absorbent tape 10. Moreover, although a fluid permeable cover 14 formed from a non-woven fabric is preferred, the cover 14 can be formed from any suitable material, such as a woven fabric, a fluid impermeable material, such as plastic, having holes formed therethrough, and the like, which allows fluid to pass therethrough without degrading in a fluid environment.

Referring to FIG. 3, the cover 14 is formed from an elongated strip of a non-woven fabric having longitudinal edges 32, 34 extending substantially parallel to a longitudinal fold line 36 (best shown in FIG. 1). The strip is folded over the absorbent material 12 about the longitudinal fold line 36, and the longitudinal edges 32, 34 of the strip are joined together, such as by thermal welding, sonic welding, adhesives, and the like, to define an inner volume 38 containing the absorbent material 12. Of course, the cover 14 can be formed in other ways known in the art, such as by joining longitudinal edges of two facing strips of fluid permeable material, forming an elongated cylindrical sleeve from a fluid permeable material, and the like.

The inner volume 38 of the cover 14 is sized to allow the absorbent material 12 to expand as the absorbent material 12 becomes saturated with a fluid without causing the cover 14 to rupture. This can be accomplished by providing an inner volume 38 that is greater than the volume of the saturated absorbent material. Of course other methods that allow a volume to expand, such as by forming pleats in the cover, forming the cover from a fluid permeable expandable material, and the like can be used without departing from the scope of the invention.

Referring back to FIGS. 1-3, the elongated fluid absorbent tape 10 is divided into the joined sections 22, 24, 26 having an end to end relation by the separating structure 28 which allows the absorbent tape 10 to be easily shortened to a desired length. Although only three sections 22, 24, 26 are shown, the fluid absorbent tape 10 can have any number of sections without departing from the scope of the invention. Preferably, the separating structure 28 is a plurality of perforations that extend between the longitudinal edges 18, 20 of the tape 10 which allow the sections 22, 24, 26 to be separated without tools. Most preferably, the separating structure 28 is formed in the tape 10 at regular intervals, such as every foot, to form sections in an end to end relation of a constant length along the length of the tape 10. Although perforations are a preferred separating structure 28 because they are small and easy to form, other structure, such as slits formed intermittingly through the tape between sections cuts formed only in the longitudinal edges of the tape, holes formed between sections, and the like, can be used to define sections and allow a user to easily select a desired shortened length of the tape for controlling the flow of a fluid on a surface.

Each section 22, 24, 26 of the tape 10 includes ends 42, 44 defined by the separating structure 28. Each end 42, 44 of each section 22, 24, 26 is preferably closed to inhibit the absorbent material 12 from falling out of the section 22, 24, 26 through the ends 42, 44. Preferably, the ends 42, 44 are closed by sonically or thermally welding the cover 14 together adjacent to, or across, the separating structure 28. Of course other methods known in the art for joining material together, such as adhesives, mechanical fasteners, and the like, can be used to close the ends 42, 44 of each section 22, 24, 26 without departing from the scope of the invention. Moreover, if separating structure 28 is not provided, the sections 22, 24, 26 can be defined by the closed ends 42, 44 of each section 22, 24, 26. Of course, if separating structure 28 is not provided, tools, such as a scissors, knife, and the like, may be required to separate the sections 24, 26 corresponding to the desired shortened length of the fluid absorbent tape 10.

The degree of closure of the section ends 42, 44 is dependent upon the particular absorbent material 12 being used. For example, if the absorbent material 12 is in the form of intermeshed fibers, merely tacking the cover 14 at one or more points between the tape edges 18, 20, such the absorbent material does not fall out may be preferred. However, if the absorbent material 12 is in powder form, sealing the ends 42, 44 across the entire width of the tape 10 may be preferred. Each section end 42, 44, however, does not need to be closed across the entire width of the section 22, 24, 26, such that the ends 42, 44 are sealed and no absorbent material 12 will fall out of the closed ends 42, 44, to fall within the scope of the invention.

A releasable adhesive 48 can be provided along the length of the fluid absorbent tape 10 to hold the tape 10 in place on a surface and act as an initial fluid barrier. The adhesive 48 can be applied directly to the cover 14 and covered by a release liner 50 that is removed prior to use. The adhesive 48 can be applied to a portion of each section 22, 24, 26 to avoid having the release liner 50 extend between sections 22, 24, 26. Alternatively, the release liner 50 can include separating structure aligned with the separating structure 28 formed in the fluid absorbent tape 10. The fluid absorbent tape 10 can also be fixed to the surface using a double-sided adhesive tape adhesively bonded to the cover 14 with a release liner covering the outwardly facing side of the double sided tape without departing from the scope of the invention.

Advantageously, the fluid absorbent tape 10 can be provided in any length, such as a 10, 25, 50, 100, 200 feet, in the form of a roll or accordion folded in a box for easy storage and shipping. Only the length of fluid absorbent tape 10 required to control the fluid on the surface is removed from the box or unrolled from the roll.

In use, the fluid absorbent tape 10 is removed from the box, or unrolled from the roll, and the adjacent sections 22, 24 of the fluid absorbent tape corresponding to the desired length of fluid absorbent tape are separated. The unused fluid absorbent tape sections 26 remain joined and in the box or on the roll for future use. Once the desired length of the fluid absorbent tape 10 has been determined and separated from the remaining fluid absorbent tape 10, the shortened length of tape 10 is placed on the surface adjacent to the surfaces that are being protected from the fluid.

When the fluid, such as a stripping solution, comes in contact with the fluid absorbent tape 10, the fluid passes through the cover 14 and is absorbed by the absorbent material 12. Advantageously, absorbent material 12, such as SAP can also swell considerably to form a physical barrier to a large flow of fluid, such as occurs while a user is spreading a stripping solution or pouring stripping solution onto a floor.

Placing the fluid absorbent tape 10 adjacent to the surface being protected and directly onto the surface containing the fluid protects the adjacent surface, and when stripping a floor with a stripping solution, the fluid absorbent tape 10 allows the stripping solution to contact the surface immediately under the fluid absorbent tape 10, thus avoiding the necessity of putting stripping solution on that area of the surface and eliminating the risk of the stripping solution flowing onto the protected adjacent surface.

Figure 4:
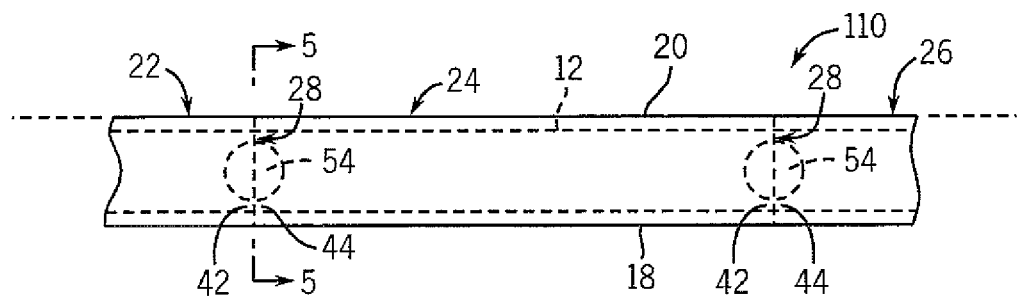
FIG. 4 is a top plan view of another embodiment of a fluid absorbent tape incorporating the present invention.
Figure 5:
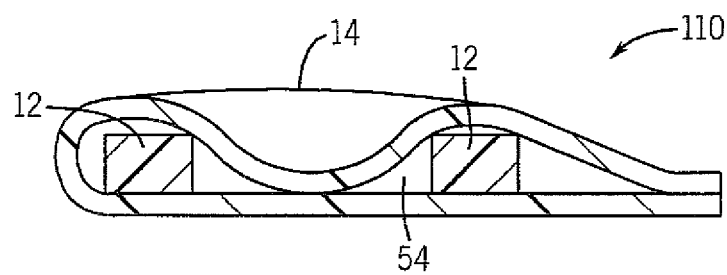
FIG. 5 is a sectional view along line 5-5 of FIG. 4.

In one embodiment shown in FIGS. 4 and 5, where the same reference numbers are used to designate the same components as in the first embodiment, the absorbent material 12 extends across the separating structure 28 along the longitudinal edges 18, 20 of a fluid absorbent tape 110. A central portion 54 of the tape 110 spaced inwardly from the longitudinal edges 18, 20 and extending across the separating structure 28 is devoid of absorbent material 12 in order to close the ends 42, 44 of the sections 22, 24, 26 by directly joining only a small portion the cover 14 together. Advantageously, this provides absorbent material 12 across the separating structure 28 to minimize the flow of fluid past the fluid absorbent tape 110 between adjacent sections 22, 24, 26.

Figure 6:
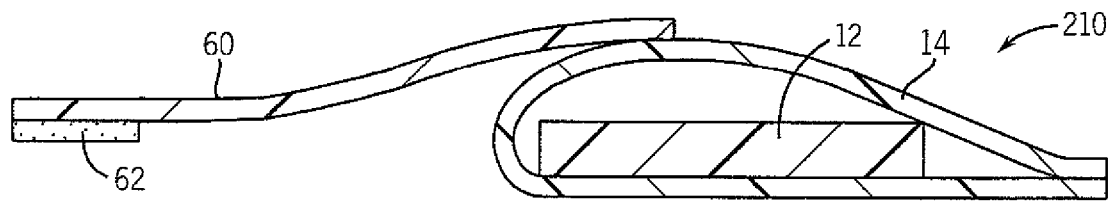
FIG. 6 is a sectional view of another embodiment of a fluid absorbent tape incorporating the present invention.

In another embodiment shown in FIG. 6, where the same reference numbers are used to designate the same components as in the first embodiment, a fluid impermeable strip 60 of material, such as plastic, is joined to the cover 14, such as by an adhesive, welding, and the like, along the length of a fluid absorbent tape 210. The fluid impermeable strip 60 can be laid over a surface, such as carpeting or a wall, adjacent to the surface having fluid thereon to protect the adjacent surface from splashing or overspray. A releasable adhesive 62 can be used to adhere the fluid impermeable strip 60 to the adjacent surface to ensure the adjacent surface remains covered.

As disclosed above, the fluid absorbent tape 10, 110, 210 can be used to control the flow of fluid on a surface, such as a stripping solution on a floor. The fluid absorbent tape 10, 110, 210 however, can be used for controlling any fluids that are absorbable by the absorbent material, such as condensation, from windows, drainage from refrigeration units, cleaning solutions, large spills of any type, and the like, without departing from the scope of the invention.

While there has been shown and described what is at present considered the preferred embodiment of the invention, it will be obvious to those skilled in the art that various changes and modifications can be made therein without departing from the scope of the invention defined by the appended claims.

I claim:

1. A fluid absorbent tape comprising:
   an elongated fluid permeable cover; and
   fluid absorbent material substantially enclosed within the elongated fluid permeable cover;
   wherein opposing layers of the elongated fluid permeable cover are connected across an interior of the cover at a plurality of longitudinally spaced locations along the cover; and
   wherein the fluid absorbent material is substantially unbroken across the plurality of longitudinally spaced locations.

2. The fluid absorbent tape as in claim 1, wherein sections of said fluid absorbent tape are divided by separating structures.

3. The fluid absorbent tape as in claim 2, wherein said separating structures are each at least partially defined by a plurality of perforations in said cover.

4. The fluid absorbent tape as in claim 3, wherein said fluid absorbent material extends across said plurality of perforations.

5. The fluid absorbent tape as in claim 3, wherein said fluid absorbent material extends across the plurality of perforations at a plurality of transversely-spaced locations.

6. The fluid absorbent tape as in claim 3, wherein said fluid absorbent material is separable at said plurality of perforations.

7. The fluid absorbent tape as in claim 2, wherein said sections have substantially the same length.

8. The fluid absorbent tape as in claim 1, wherein said fluid permeable cover is formed from an elongated strip of fluid permeable material having longitudinal edges extending substantially parallel to a longitudinal fold line, wherein said strip is folded over said absorbent material about the longitudinal fold line, and said longitudinal edges of said strip are joined together.

9. The fluid absorbent tape as in claim 1, further comprising a fluid impermeable strip of material for protecting a surface adjacent the tape.

10. The fluid absorbent tape as in claim 1, further comprising an adhesive to secure the tape to a surface.

11. The fluid absorbent tape of claim 1, wherein the fluid permeable cover includes an upper fluid permeable layer and a lower fluid permeable layer.

12. A fluid absorbent tape comprising:
    a fluid absorbent material having an elongated shape extending along a longitudinal axis of the fluid absorbent tape;
    an elongated fluid permeable cover extending along the longitudinal axis and substantially surrounding the fluid absorbent material, the elongated fluid permeable cover defining an interior within which the fluid absorbent material is located;
    the fluid absorbent material sandwiched between different portions of the elongated fluid permeable cover at a location along the longitudinal axis, and
    the different portions of the elongated fluid permeable cover extending across the interior of the fluid permeable cover and in contact with one another at the location along the longitudinal axis.

13. The fluid absorbent tape as in claim 12, wherein sections of said fluid absorbent tape are divided by separating structures.

14. The fluid absorbent tape as in claim 13, wherein said separating structures are each at least partially defined by a plurality of perforations in said cover.

15. The fluid absorbent tape as in: claim 14, wherein said fluid absorbent material extends across said plurality of perforations.

16. The fluid absorbent tape as in claim 14, wherein said fluid absorbent material extends across the plurality of perforations at a plurality of transversely-spaced locations, one of which is the location along the longitudinal axis.

17. The fluid absorbent tape as in claim 14, wherein said fluid absorbent material is separable at said plurality of perforations.

18. The fluid absorbent tape as in claim 13, wherein said sections have substantially the same length.

19. The fluid absorbent tape as in claim 12, wherein said fluid permeable cover is formed from an elongated strip of fluid permeable material having longitudinal edges extending substantially parallel to a longitudinal fold line, wherein said strip is folded over said fluid absorbent material about the longitudinal fold line, and said longitudinal edges of said strip are joined together.

20. The fluid absorbent tape as in claim 12, further comprising a fluid impermeable strip of material for protecting a surface adjacent the tape.

21. The fluid absorbent tape as in claim 12, further comprising an adhesive to secure the tape to a surface.

22. The fluid absorbent tape of claim 12, wherein the fluid permeable cover includes an upper fluid permeable layer and a lower fluid permeable layer.

* * * * *